United States Patent
Shah

(10) Patent No.: US 11,593,514 B2
(45) Date of Patent: Feb. 28, 2023

(54) SYSTEM AND METHOD FOR THE DISCOVERY AND PROTECTION OF SENSITIVE DATA

(71) Applicant: Datasparc, Inc., San Diego, CA (US)

(72) Inventor: Manish A. Shah, San Diego, CA (US)

(73) Assignee: DATASPARC INC., San Diego, CA (US)

( * ) Notice: Subject to any disclaimer, the term of this patent is extended or adjusted under 35 U.S.C. 154(b) by 207 days.

(21) Appl. No.: 17/026,927

(22) Filed: Sep. 21, 2020

(65) Prior Publication Data

US 2022/0092212 A1   Mar. 24, 2022

(51) Int. Cl.
  *G06F 21/62* (2013.01)
  *G06N 20/00* (2019.01)
  *G06F 21/57* (2013.01)

(52) U.S. Cl.
  CPC .......... *G06F 21/6245* (2013.01); *G06F 21/57* (2013.01); *G06N 20/00* (2019.01)

(58) Field of Classification Search
  CPC ...... G06F 21/6245; G06F 21/57; G06N 20/00
  See application file for complete search history.

(56) References Cited

U.S. PATENT DOCUMENTS

| | | | |
|---|---|---|---|
| 2009/0328134 A1* | 12/2009 | Ray | G06F 21/105 726/1 |
| 2018/0020001 A1* | 1/2018 | White | H04L 63/0428 |
| 2018/0232528 A1* | 8/2018 | Williamson | G06F 16/285 |
| 2020/0076578 A1* | 3/2020 | Ithal | G06F 21/6227 |
| 2020/0311304 A1* | 10/2020 | Parthasarathy | G06F 11/3006 |

* cited by examiner

*Primary Examiner* — Joseph P Hirl
*Assistant Examiner* — Aayush Aryal
(74) *Attorney, Agent, or Firm* — Siritzky Law, PLLC

(57) ABSTRACT

A computer-implemented method, implemented by one or more computers including hardware and software. The method includes determining whether a computer system contains data subject to a protection policy; in response to a determination that the computer system contains data or information subject to said protection policy, determining whether the data is already subject to protection according to said protection policy; and in response to said determining, that the computer system contains data or information that is not already subject to protection according to said protection policy, applying or implementing the protection policy on the data or information.

13 Claims, 12 Drawing Sheets

SYSTEM AND METHOD FOR THE DISCOVERY AND PROTECTION OF SENSITIVE DATA

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to database and data management, including a system for discovering and protecting sensitive data in databases and files on a network.

BACKGROUND

Corporate computer networks may have hundreds or even thousands of data directories and connected databases spread over numerous computers. Oftentimes, the databases may be created by each department or group within the company, with little understanding of or adherence to privacy protocols or policies required for the storage of sensitive data. In addition, different types of databases may be implemented by different groups at different times, leading to inconsistencies in corporate network structures. Databases also may be duplicated, or data may be exported from one database to another, adding to the fragmentation of the corporate network and the data it may store.

In some cases, users may create ad hoc databases, e.g., in the form of text files or spreadsheets or the like, and these may include potentially sensitive data such as data that should be restricted based on policies and/or statutes or regulations.

This poses a challenge for system administrators and, in particular, database administrators charged with managing databases and sensitive data across large networks.

Accordingly, there is a need for a system and method of automatically discovering data on computers on a computer network that should be subject to restrictions (e.g., privacy restrictions). And there is a need for provisioning of restrictions on potentially sensitive data that is discovered on a computer network.

There is a need for a system and method for automatically discovering databases and data files on computers on a network, for scanning the databases and files for sensitive data, and for the provisioning of privacy policies to the databases and files to protect the sensitive data per industry standards.

SUMMARY

The present invention is specified in the claims as well as in the below description. Preferred embodiments are particularly specified in the dependent claims and the description of various embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method. The computer-implemented method also includes (a) determining whether a computer system contains data subject to a protection policy. The method also includes (b) in response to a determination that the computer system contains data or information subject to said protection policy, determining whether the data is already subject to protection according to said protection policy. The method also includes (c) in response to said determining in (b), that the computer system contains data or information that is not already subject to protection according to said protection policy, applying or implementing the protection policy on the data or information.

Other embodiments of this aspect include corresponding computer systems, apparatus, and computer programs recorded on one or more computer storage devices, each configured to perform the actions of the methods.

Implementations may include one or more of the following features, alone and/or in various combinations:
  The method where the determining in (a) may include one or more of: (a)(1) scanning the computer system to identify at least one database and/or file that contains data or information that is not already subject to protection according to said protection policy.
  The determining in (b) may include ascertaining whether the at least one database and/or file contains data or information subject to said protection policy.
  The ascertaining may include scanning the at least one database and/or file for information identified by at least one data criterion.
  Data or information subject to said protection policy may include sensitive information or data.
  The at least one data criterion is based on at least one data attribute of the sensitive information or data.
  The at least one data criterion was determined using machine learning.
  Determining whether the at least one database and/or file contains data or information subject to said protection policy may include: scanning the at least one database and/or file to determine whether the at least one database and/or file contains data or information subject to said protection policy.
  The method may include applying the protection policy to data or information from the at least one database and/or file.
  The method may include (d) storing information regarding the at least one database and/or file.
  A non-transitory computer-readable medium with one or more computer programs stored therein that, when executed by one or more processors of a device, cause the one or more processors to perform the method(s).

Implementations of the described techniques may include hardware, a method or process, or computer software on a computer-accessible medium.

Below is a list of process (or method) embodiments. Those will be indicated with a letter "P". Whenever such embodiments are referred to, this will be done by referring to "P" embodiments.

P1. A computer-implemented method, implemented by one or more computers including hardware and software, the method comprising:
  (A) determining whether a computer system contains data subject to a protection policy;
  (B) in response to a determination that the computer system contains data or information subject to said protection policy, determining whether the data is already subject to protection according to said protection policy; and (C) in response to said determining in (B), that the computer system contains data or information that is not already subject to protection according to said protection policy, applying or implementing the protection policy on the data or information.

P2. The method of any of the embodiment(s) P1, wherein the determining in (A) comprises one or more of:

(A)(1) scanning the computer system to identify at least one database and/or file that contains data or information that is not already subject to protection according to said protection policy.

P3. The method of any of the embodiment(s) P1-P2, wherein the determining in (B) comprises ascertaining whether the at least one database and/or file contains data or information subject to said protection policy.

P4. The method of any of the embodiment(s) P3, wherein the ascertaining comprises scanning the at least one database and/or file for information identified by at least one data criterion.

P5. The method of any of the embodiment(s) P1-P4, wherein data or information subject to said protection policy comprises sensitive information or data.

P6. The method of any of the embodiment(s) P5, wherein the at least one data criterion is based on at least one data attribute of the sensitive information or data.

P7. The method of any of the embodiment(s) P4-P6, wherein the at least one data criterion was determined using machine learning.

P8. The method of any of the embodiment(s) P3-P7, wherein determining whether the at least one database and/or file contains data or information subject to said protection policy comprises:

scanning the at least one database and/or file to determine whether the at least one database and/or file contains data or information subject to said protection policy.

P9. The method of any of the embodiment(s) P2-P8, further comprising:

applying the protection policy to data or information from the at least one database and/or file.

P10. The method of any of the embodiment(s) P2-P9 further comprising:

(D) storing information regarding the at least one database and/or file.

Below is a list of computer-readable medium embodiments. Those will be indicated with a letter "C". Whenever such embodiments are referred to, this will be done by referring to "C" embodiments.

C11. A non-transitory computer-readable medium with one or more computer programs stored therein that, when executed by one or more processors of a device, cause the one or more processors to perform the method of any of the embodiment(s) P1-P10.

Other embodiments of this aspect include corresponding computer systems, apparatus, and computer programs recorded on one or more computer storage devices, each configured to perform the actions of the methods.

The above features along with additional details of the invention, are described further in the examples herein, which are intended to further illustrate the invention but are not intended to limit its scope in any way.

BRIEF DESCRIPTION OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF EXEMPLARY EMBODIMENTS

Figure 1:
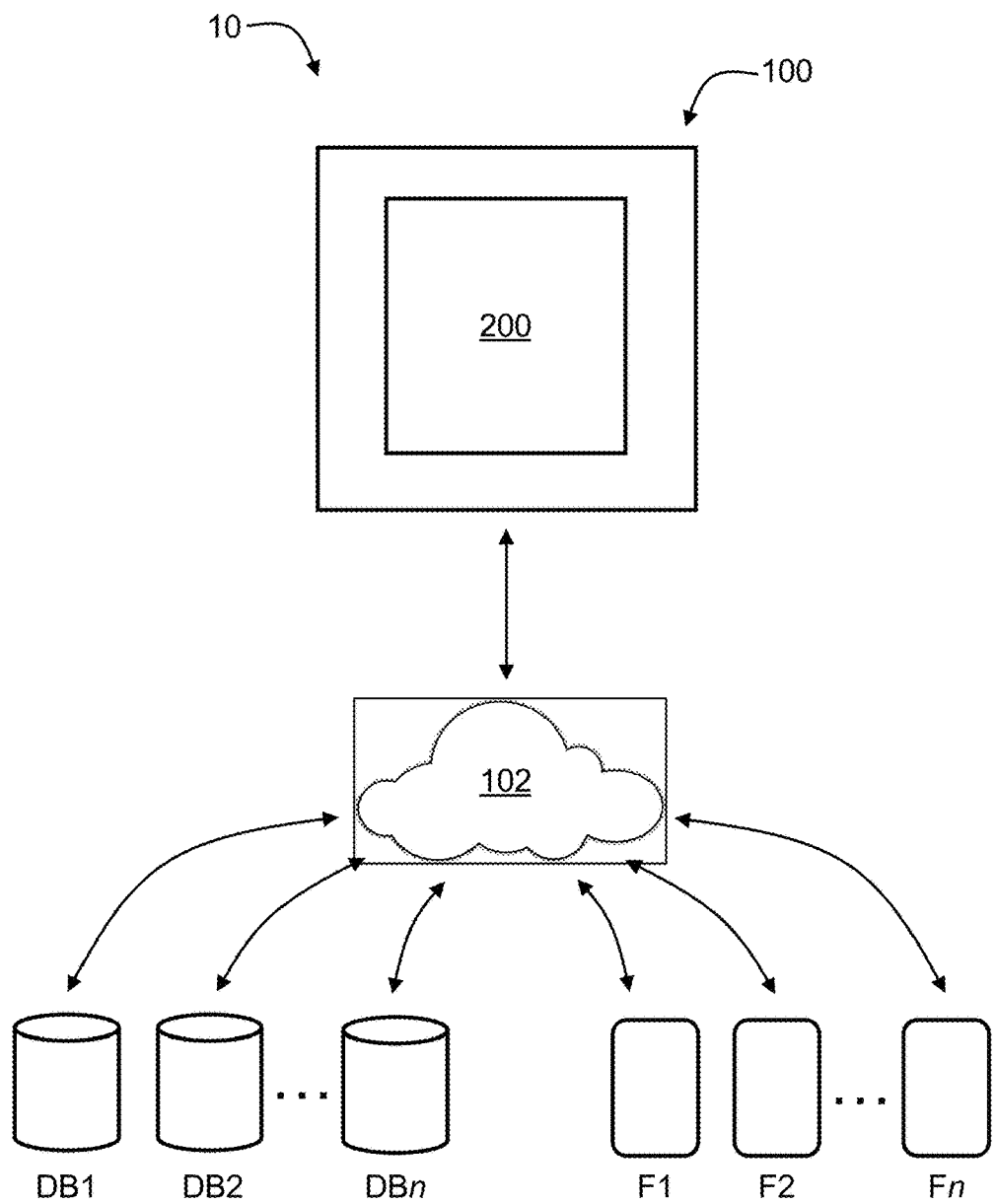
FIG. 1 depicts aspects of a database and file discovery and protection system according to exemplary embodiments hereof.

As used herein, the following terms have the following meanings unless specifically stated otherwise:

API means Application Programming Interface.

DBA means database administrator.

JDBC means Java Database Connectivity.

ODBC means Open Database Connectivity.

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Sensitive Data/Information

In general, as used herein, sensitive data refers to data or information that should or must be protected from unauthorized access and unwarranted disclosure in order to safeguard the privacy or security or policy of an individual or organization.

Sensitive information may be classified into three main categories (without limitation): (i) personal information, (ii) business information, and (iii) classified information.

Sensitive personal information is data that can be traced back to an individual and that, if disclosed, could result in harm to that person. Examples include (without limitation): (i) financial information such as credit card numbers, banking information, tax forms, and credit reports, etc., (ii) protected health information (PHI) such as medical records, laboratory tests, and insurance information, etc., (iii) unique identifiers such as passport or social security numbers, dates and places of birth, biometric records, mother's maiden names, etc., (iv) contact information such as address, email address, phone number, etc., (v) educational information such as enrollment records and transcripts, etc., and other types of personal information.

Sensitive business information includes information that may pose a risk to the company in question if discovered by a competitor or the general public. Such information may include trade secrets, intellectual property, acquisition plans, financial data, sales data, supplier and customer information, and other types of business information.

Sensitive classified information includes information restricted by a government body according to levels of sensitivity (e.g., restricted, confidential, secret, and top secret). The intent is to limit the people who may have access to the information. This information is typically classified to protect the security of a nation.

Each type of sensitive information is often mandated to be protected using specific privacy policies. For example, sensitive credit card data may be protected using the Payment Card Industry Data Security Standard (PCI DSS), and sensitive healthcare data may be protected by following the regulations laid out in the Health Insurance Portability and Accountability Act of 1996 (HIPAA).

Table I below shows a sampling of privacy policies and regulatory commissions that have been established to provide privacy standards for particular types of sensitive information. It is understood that the list is not exhaustive, and that the system may implement some of the regulations as required. It also is understood that the system may implement any type of data privacy regulations and protocols and that the scope of the system is not limited in any way by the data privacy policies that it may implement.

TABLE I

| Regulation | Applied to: |
| --- | --- |
| PCI-DSS (Payment Card Industry Data Security Standard) | Credit card information |
| HIPAA (Health Insurance Portability and Accountability Act of 1996) | Healthcare data |
| GDPR (General Data Protection Regulation) | European Union citizens |
| CCPA (California Consumer Privacy Act) | Consumer protection for residents of California |
| AICPA (American Institute of Certified Public Accountants) | Tax and accounting information |
| SOX (Sarbanes-Oxley Act) | Public and private companies, management firms and public accounting firms |
| GLBA (Gramm-Leach-Bliley Act) | Insurance companies, commercial banks, investment banks and security firms |
| FISMA (Federal Information Security Management Act of 2002) | Federal agencies |
| FERPA (Family Educational Rights and Privacy Act of 1974) | Educational information |

As should be understood, whether certain data or information is sensitive may be based on internal policies (e.g., company policies) and/or external requirements (e.g., statutes, regulations, etc.).

Those of skill in the art will understand, upon reading this description, the decision as to whether to consider certain data or information as sensitive may be entity specific.

Overview

In general, according to some aspects, a system according to exemplary embodiments hereof provides for the discovery of data (e.g., databases and/or files) on a network of computers, for the evaluating the data (e.g., databases and/or files) for sensitive data, and for the subsequent implementation of security policies (e.g., cybersecurity) on sensitive data discovered. In one example, the network may include a corporate network that may be deployed on-premises, and/or in the cloud.

A brief summary of acts an exemplary system may perform is provided below for a general understanding.

1) The system may scan a network, such as a corporate network, to discover data (e.g., databases and/or files, including databases and/or files not yet known to the system);
2) For data discovered in (1), the system may connect to the discovered data (e.g., database(s) and/or file(s)), add information regarding the data to a system log, and may notify an administrator (database administrator);
3) The system may then evaluate (e.g., by scanning) discovered data to discover potentially sensitive data;
4) The system may apply appropriate policies (e.g., cybersecurity policies) to protect sensitive data found in the discovered data.

It is understood that the acts described above are meant as a general overview and demonstration of an exemplary system's functionalities, and that the system may perform different and/or additional acts as described herein.

In some embodiments, the system also may include a data accessing mechanism, including, e.g., a data viewer that may enable a user to access and view data stored within a database, a file, and/or in other locations. As described herein, the data accessing mechanism (e.g., including viewer) may implement the appropriate policies to sensitive data in situ as the data are accessed by one or more users, thereby limiting or otherwise restricting access to the data. For example, in some embodiments, the data viewer of the accessing mechanism may mask or somehow restrict access to and viewing of one or more portions of sensitive data (e.g., the first 8 digits of a stored telephone number or the first 12 digits of a credit card number) so as to enforce restriction policies on the sensitive data.

Further details of any exemplary system are described below with reference to FIGS. 1-10.

System 10

In one exemplary embodiment hereof as shown in FIG. 1, the system 10 includes a backend system 100 running a software platform 200. The system 10 may interface via one or more computers (not shown) with one or more databases DB1, DB2, . . . DBn (collectively and individually DB), and with one or more files F1, F2, . . . Fn (collectively and individually F) through one or more networks 102. The networks 102 may include the Internet, LAN, WAN, Wi-Fi, cellular, telephony, Bluetooth, other types of networks and any combination thereof. The databases DB may be connected to ports on one or more computers on the network 102, and the files F may be stored in directories on one or more computers on the network 102.

The databases DB may include any types of databases, including without limitation, SQL, NoSQL, any other types of relational and/or non-relational databases, any other types of databases, and any combination thereof. The databases DB may be cloud-based, on-premises, centralized, distributed, personal, end user, commercial, operational, object-oriented, graph, other types of databases and any combination thereof.

The files F may include any types of files, including without limitation, text files (e.g., delimited text files such as comma-separated values (CSV) or other types), Excel files, other types of files and any combination thereof.

Backend System 100

The backend system 100 may include one or more servers (such as on-premise and/or Internet servers) and may include all of the components (hardware and software) necessary to implement its functionalities. For example, the backend system 100 may include a CPU, microprocessor, microcontroller, chipset, control board, RAM, general memory, network boards, power supplies, an operating system, software, firmware, applications, scripts, databases, and any other component, application, mechanism, device or software as required.

In some embodiments, the software system 200 (described in more detail below) is loaded onto and run by the backend system 100. In this way, the backend system 100 may generally implement at least some of the functionalities of the software platform 200. For example, the backend system 100 may be connected to one or more databases DB and/or to one or more files F through a network 102, and may implement the software platform 200 to scan and/or implement security protocols on the databases DB and/or files F as described herein.

Software Platform 200

The software system/platform 200 may be installed and run on the backend system 100 and may act as a secure central point for discovering, analyzing and protecting databases DB and/or files F on a network 102.

Figure 2:
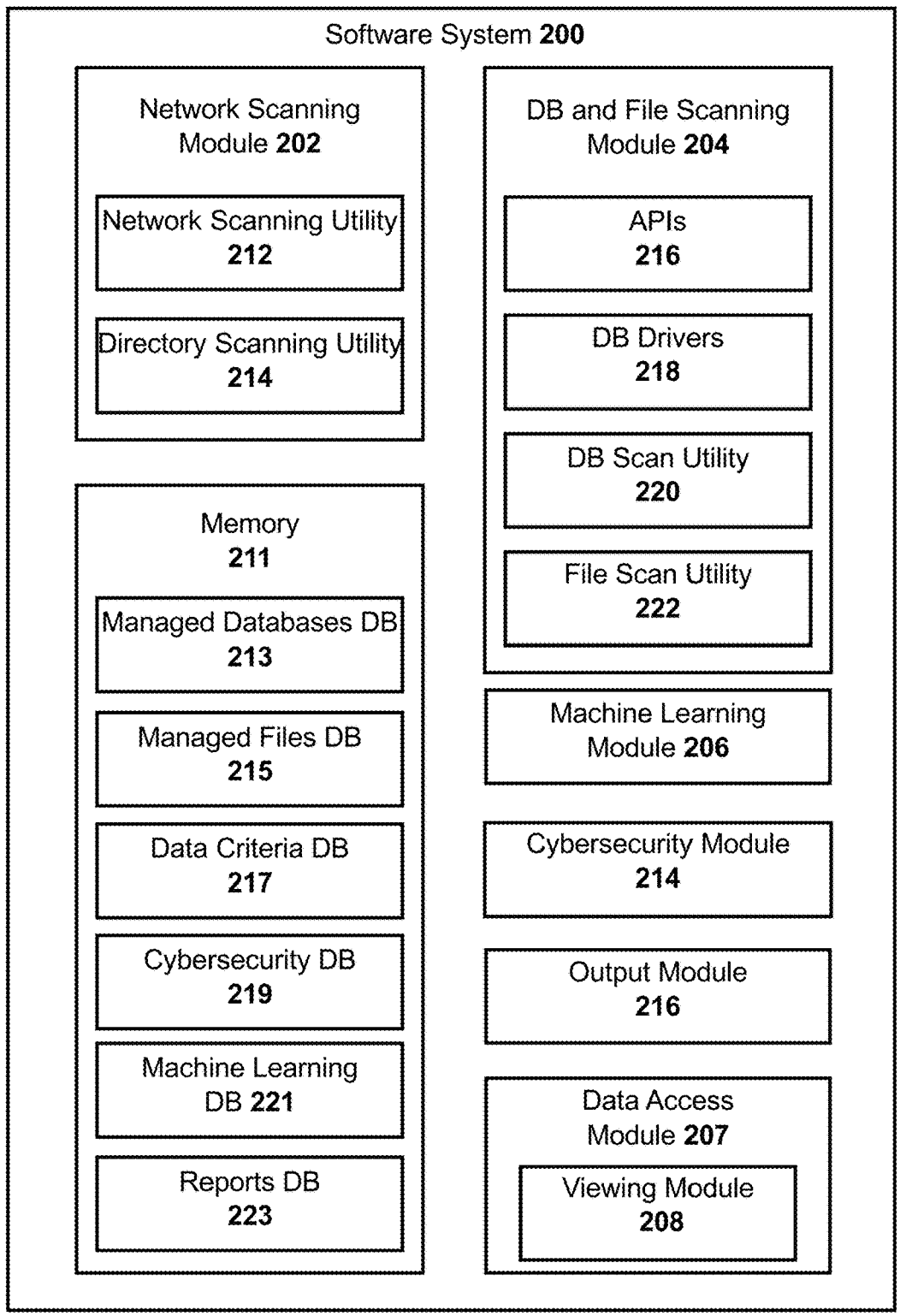
FIG. 2 depicts aspects of a software system according to exemplary embodiments hereof.

With reference to FIG. 2, a software system 200 according to exemplary embodiments hereof may include:

1. A network scanning module 202 that may include one or more network scanning utilities 212, and/or one or more directory scanning utilities 214;
2. A database and file scanning module 204 that may include one or more application programming interfaces (APIs) 216, one or more database drivers 218, one or more database scanning utilities or applications 220, and/or one or more file scanning utilities or applications 222;
3. A machine learning module 206;
4. A data access module 207;
5. A data viewing module 208;
6. A cybersecurity module 209;
7. A data output module 210;
8. Memory 211; and
9. Other components that may be necessary for the it to perform its required functionalities.

The one or more APIs 216 may include Java Database Connectivity (JDBC), Open Database Connectivity (ODBC), other types of APIs and any combination thereof. The one or more database drivers 218 may include JDBC drivers, ODBC drivers, other types of database drivers and any combination thereof. The database drivers 218 may provide a connection to each database DB and subsequently implement protocols that enable the APIs 216 to interface with the databases DB. The database and file scanning application 204 and/or the security module 209 may then interface each database DB via the APIs 216.

The memory 211 may include one or more databases, logs, other types of data storage elements and any combination thereof. For example, in some embodiments, the memory 211 may include the following databases:

1. Managed databases DB database 213: This database may store information pertaining to databases DB discovered and/or managed by the system 10.
2. Managed Files F database 215: This database may store information pertaining to files F discovered and/or managed by the system 10.
3. Sensitive data criteria database 217: This database may store information pertaining to one or more data criteria as will be described in other sections.
4. Cybersecurity database 219: This database may store information pertaining to the cybersecurity regulations and associated sensitive data file attributes as will be described in other sections.
5. Machine learning database 221: This database may store information pertaining to the functionality of the machine learning module 206 as will be described in other sections.
6. Report database 223: This database may store information pertaining to any reports generated by the system 10.

It is understood that the software system 200 may include additional modules, applications, databases, and/or other components as required. It also is understood that the software system 200 may not include all of the elements described above.

Additional embodiments and details of the system 10 will be described by way of several detailed acts that the system 10 may perform during its operation. The acts provided below are chosen to illustrate various embodiments and implementations of the system 10, and those of ordinary skill in the art will appreciate and understand, upon reading this description, that the acts are not limiting and that the system 10 may be used in different ways. It is also understood that details of different embodiments described in different acts may be combined in any way to form additional embodiments that are all within the scope of the system 10.

Scanning for Databases

In some embodiments, the network scanning utility 212 may scan a network 102 for databases DB yet to be discovered by the system 10. The network scanning utility 212 may be automatically triggered to scan the network 102 at preset time intervals, may be manually triggered by a database administrator, by other trigger methods, or by any combination thereof.

Figure 3:
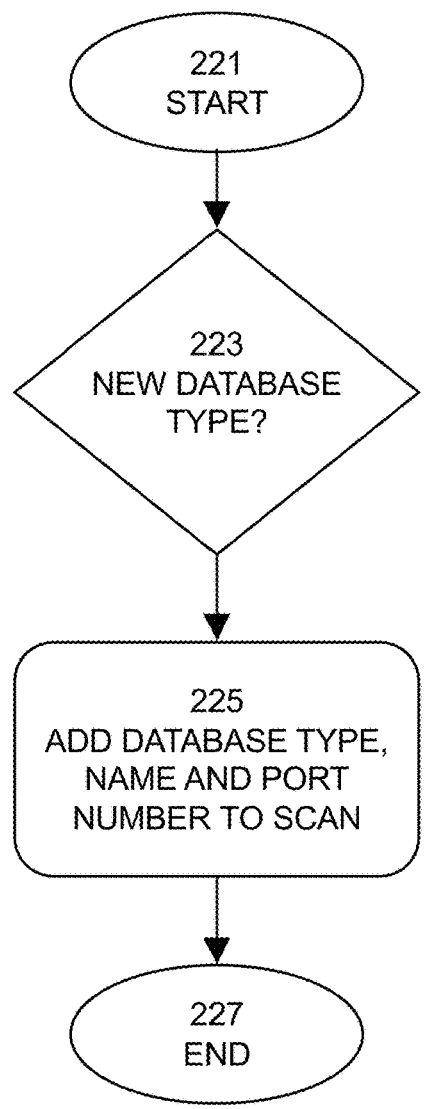
FIGS. 3-6 are flowcharts showing aspects of an exemplary workflow according to exemplary embodiments hereof.

In a first example as shown in FIG. 3, the network scanning utility 212 may be triggered (at 221), e.g., automatically or by an administrator, to scan a network 102. If a new database is discovered (at 223), the network scanning utility 212 adds information regarding the discovered database DB (e.g., the database type, name, and port number) to the managed databases database 213 (at 225). The network scanning utility 212 may notify a database administrator of such. The process may then end (at 227). The network scanning utility 212 may thus add a new database or database type to the system.

Figure 4:
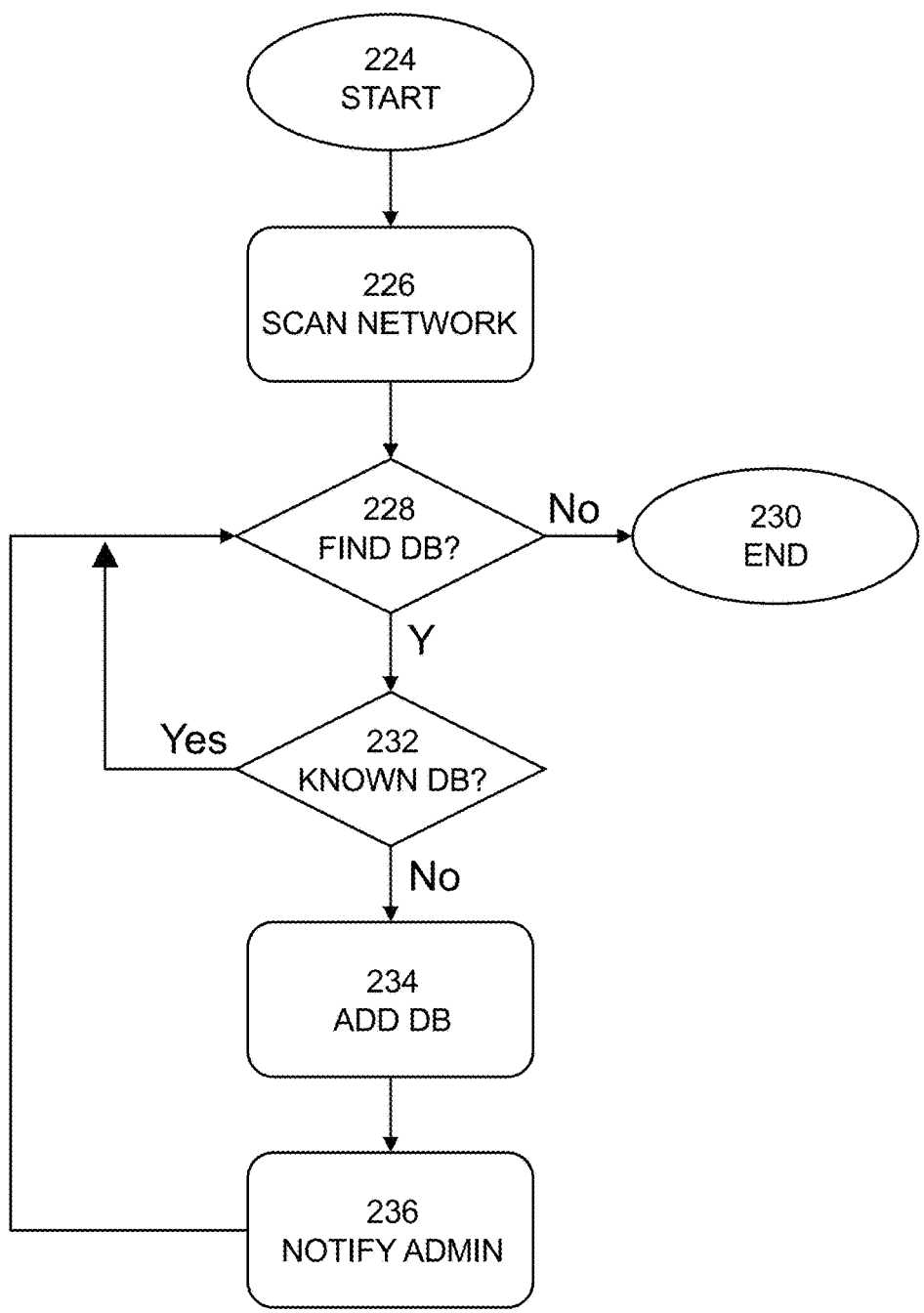

In a second example as shown in FIG. 4, the network scanning utility 212 may be triggered (at 224), e.g., automatically or by an administrator, to scan a network 102 (at 226). If no open database ports are discovered (at 228), the network scanning utility 212 may end (at 230). If, however, the network scanning utility 212 discovers an open database port at a particular IP address (at 228), the network scanning utility 212 compares the discovered database DB with a managed databases database 213 of existing databases DB on the backend system 100 (at 232). If the newly discovered database DB is included in the databases database 213, the network scanning utility 212 returns to 228. If the newly discovered database DB is not included in the databases database 213, the network scanning utility 212 subsequently adds it thereto (at 234) and may notify a database administrator of this (at 236). The utility 212 then returns to 228 to process any additional discovered databases. If there are additional discovered databases DB to be checked against the log (at 228), the network scanning utility 212 checks the next discovered database DB (at 232) and repeats the process. Once all of the discovered databases DB discovered in 228 are checked against the databases database 213 (at 232), the network scanning utility 212 may end (at 230) and await a subsequent trigger event.

In some embodiments, the network scanning utility 212 may provide at least some of the following information to the backend system 100 and/or a database administrator (without limitation) pertaining to discovered databases DB: host name/IP address of the database server, port number where the database DB may be running and open for connection, database username and password, and/or other information.

In some embodiments, the network scanning utility 212 may be pre-configured to scan for particular types of databases DB at particular default database ports. For example, the network scanning utility 212 may be configured to look for Oracle databases running on port 1521, and/or MySQL databases running on port 3306.

Scanning for Files

In some embodiments, the directory scanning utility 214 may scan one or more directories for files F yet to be discovered by the system 10. In some embodiments, the directory scanning utility 214 may be preprogrammed to search for files meeting predetermined file criteria. For example, the directory scanning utility 214 may search for particular types of files F (e.g., files with particular file extensions such as .txt, .xlsx, etc.) and/or located in specific file directory locations. The directory scanning utility 214 may be automatically triggered to scan the directories at preset time intervals, may be manually triggered by a database administrator, may be triggered by other trigger methods, or by any combination thereof.

The directory scanning utility 214 may search for known directories (e.g., by name) and then look for files in those directories. Alternately, the directory scanning utility 214 may look for all directories that can access/find on a system.

Figure 5:
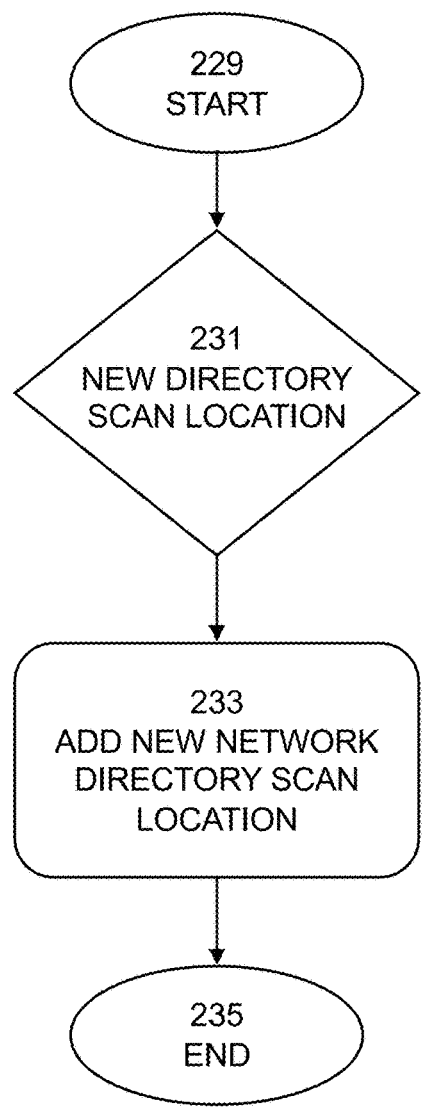

In an example as shown in FIG. 5, the database administrator may trigger the directory scanning utility 214 (at 229) to scan a network 102 for new directories. If a new directory is discovered (at 231), the directory scanning utility 214 adds information regarding the discovered directory to the managed files database 215 (e.g., the directory location on the network 102) (at 233) and may notify the database administrator of such. The process may then end (at 235).

Figure 6:
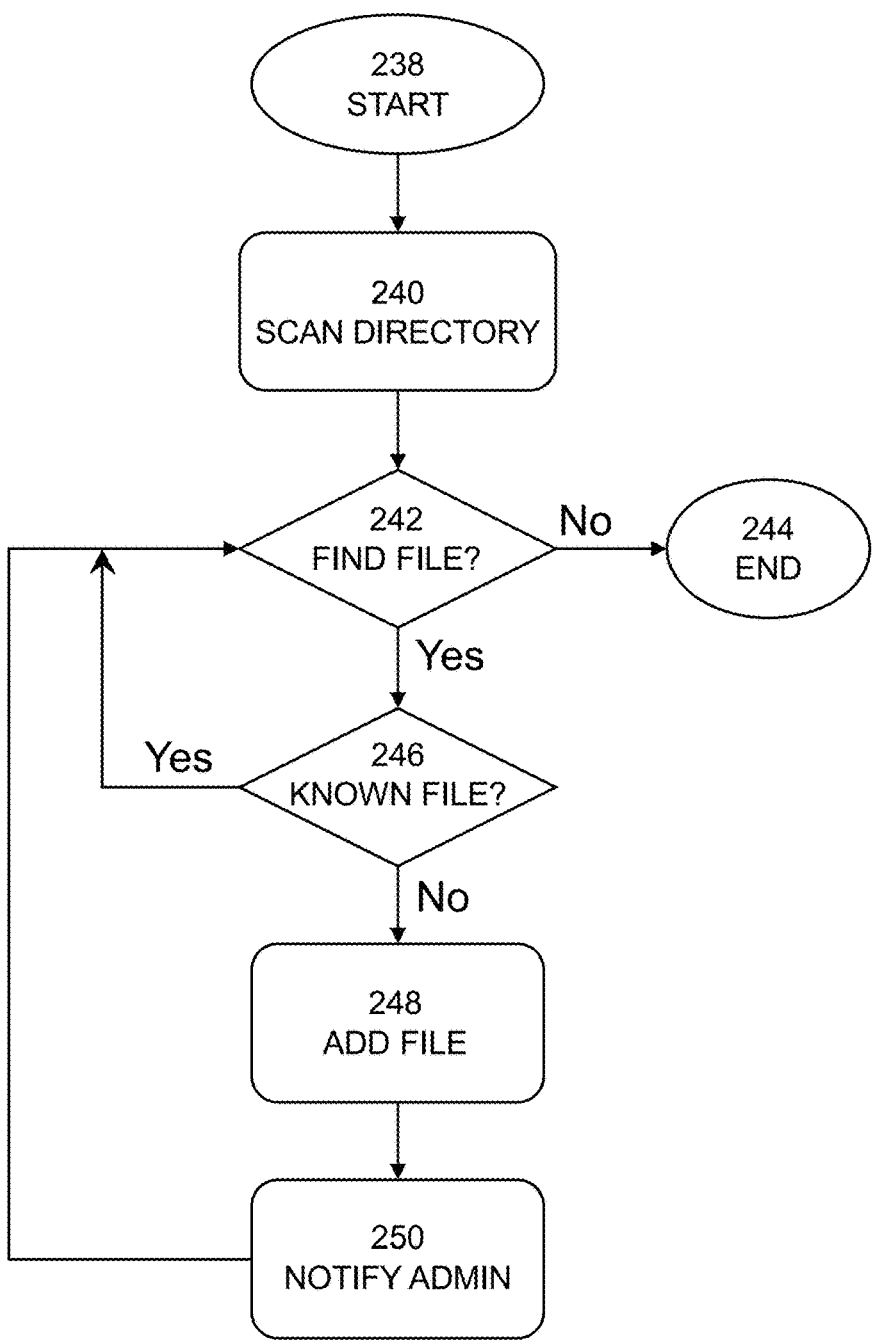

In another example, as shown in FIG. 6, the database administrator may trigger the directory scanning utility 214 (at 238) to scan a directory (at 240). If no files F meeting a predetermined file criteria are discovered in the directory (at 242), the directory scanning utility 214 may end (at 244). If, however, the directory scanning utility 214 discovers a file F meeting the file criteria (at 242), the directory scanning utility 214 compares the discovered file F with existing files F in the managed files database 215 of on the backend system 100 (at 246). If the newly discovered file F is already included in the files database 215, the directory scanning utility 214 returns to check other files (at 242). If the newly discovered file F is not already included in the files database 215, the directory scanning utility 214 subsequently adds it thereto (at 248) and may notify a database administrator of this (at 250). The directory scanning utility 214 then returns check other files (at 242). If there are additional discovered files F (at 242) to be checked against the files database 215 (at 246), the directory scanning utility 214 checks the next discovered file F (at 246) and repeats the process. Once the discovered files F (discovered at 242) are checked against the files database 215 (at 246), the directory scanning utility 214 may end (at 244) and await a subsequent trigger event.

Scanning Databases for Sensitive Information

Once the system 10 has discovered one or more database(s) DB of interest on a network 102 and has logged each database DB with the backend system 100, the system 10 next may scan each discovered database DB for sensitive or potentially sensitive data or information (discussed above). The database DB scan may be triggered by a database administrator, may automatically trigger at predetermined time intervals, or may be triggered by other triggering methods.

In some embodiments, the database scanning utility or application 220 interfaces with each database DB via an applicable API 216 and database driver 218. The database scanning application 220 may scan all or a portion of the data stored within each database DB. For example, the database scanning application 220 may scan at least some of the following elements of a database DB looking for sensitive data: database schema, schema elements, indexes, tables, fields and columns, records and rows, keys, relationships, data types and other elements related to the database DB. The types of data may include alphanumeric, numeric, date and time, and other types of data.

In some embodiments, the database scanning application 220 may be preprogrammed to search for specific sensitive data that meets predetermined data criteria. In some embodiments, the data criteria may reflect data of a specific type and/or data with specific attributes. The data criteria also may reflect types of data that may be protected using one or more specifically associated regulations (e.g., as shown in Table I).

For instance, using credit card information as an example, the predetermined data criteria may include data attributes such as (without limitation):

1. Particular lengths of data strings, e.g., the data criteria may include 16-digit numeric data strings that may represent credit card numbers;
2. Particular sequences of data elements within the data, e.g., the data criteria may include data comprising two numeric digits followed by a forward slash followed by two numeric digits that may represent a credit card expiration date;
3. Particular combinations of data attributes that may enable the application 209 to recognize names, addresses, PINs, CVVs, phone numbers, email addresses, etc.
4. Particular data known to be protected by particular regulations, such as credit card information protected by PCI-DSS standards.

In an example, the database scanning application 220 may scan each database DB looking for numeric 16-digit data strings that may represent credit card numbers, for two numeric digits followed by a forward slash followed by two numeric digits that may represent credit card expiration dates, and/or for other data that may include attributes resembling card verification values (CVV), personal identification numbers (PINs), cardholder names and addresses, cardholder social security numbers, card passwords, and other types of sensitive data pertaining to credit cards. The database scanning application 220 also may scan each database DB looking for data protected by a particular privacy regulation (in this example, by PCI-DSS standards) and may return the associated data accordingly.

It is understood that the example data criteria for the credit card data example described above is meant for demonstration and that the same principle may be applied to any types of sensitive data pertaining to any types of privacy regulations as described herein or otherwise.

Once the sensitive data within one or more databases DB is discovered, those data may be appropriately protected as described below.

Those of skill in the art will understand, upon reading this description, that as used herein, the term "appropriately protected" means protected according to policies and/or rules and/or requirements, etc. of an entity.

Scanning Files for Sensitive Information

Once the system 10 has discovered one or more file(s) F of interest in a directory on a computer on the network 102 and has logged each file F with the backend system 100, the system 10 next may scan each file F for sensitive data. The file F scan may be triggered, e.g., by a database administrator, automatically at predetermined time intervals, or may by other triggering methods.

In some embodiments, the file scanning application 222 may interface with each file F and may scan all or a portion of the data stored within each file F. For example, the file scanning application 222 may scan at least some of the following elements that may be contained within each file F: alphanumeric data, numeric data, data and time data, tables of data, charts of data, graphs of data, other types of data and any combination thereof. It is preferable that the file scanning application 222 include each necessary driver required to interface with each type of file F (e.g., text file driver, Excel file driver, Word file driver, PowerPoint file driver, etc.) and/or an optical character reader (OCR) to convert images within the files F into machine-encoded text.

In some embodiments, the file scanning application 222 may be preprogrammed to search for specific sensitive data that meets predetermined data criteria. In some embodiments, the data criteria may reflect data of a specific type and/or data with specific attributes. The data criteria also may reflect types of data that may be protected using one or more specifically associated regulations (e.g., as shown in Table I).

It is understood that the details pertaining to this provided above with regards to the database scanning application 220 may also pertain to the file scanning application 222, and so these details are not be reproduced here.

Once the sensitive data within one or more files F is discovered, it may be appropriately protected as described herein.

Machine Learning

In some embodiments, the database scanning application 220 and/or the file scanning application 222 may not immediately recognize data with particular data attributes within a database DB and/or file F, and as such, may not immediately determine if the data are sensitive data. For example, the data attributes may not yet be known and/or stored in the data criteria database 217. In this case, the system 10 may implement machine learning to learn the new data attributes, to make the necessary determinations, and to update the data criteria database 217 accordingly.

In some embodiments, the system 10 may implement machine learning to learn new attributes of potentially sensitive data and to provide these learned attributes to other modules, utilities and/or applications of the system 10 for use. For example, the machine learning module 206 may learn a new data attribute and create new data criteria based on a new attribute. The module 206 may then provide the newly created data criteria to the database scanning application 220 and/or the file scanning application 222 for implementation during future scans.

Figure 7:
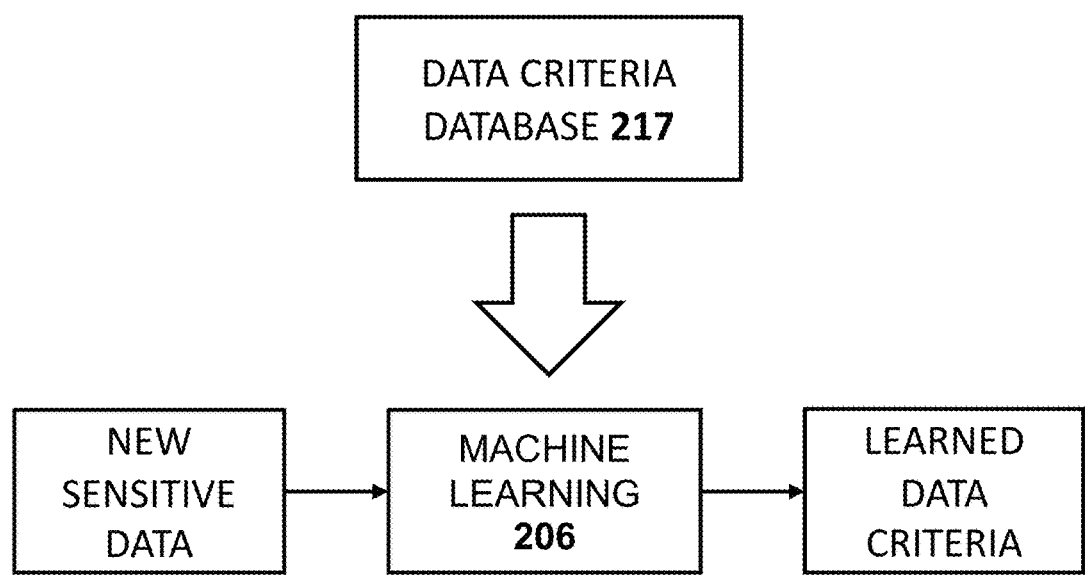
FIGS. 7-8 are schematics representing machine learning processes according to exemplary embodiments hereof.

During the machine learning process, the software system 200 may store known data attributes and associated data criteria into the data criteria database 217. Then, as shown in FIG. 7, as new sensitive data with new data attributes is identified (e.g., by the database administrator, by a regulatory entity, etc.), the new sensitive data may be applied to the machine learning module 206 and compared to the data criteria in database 217. The machine learning module 206 may then learn to recognize the new sensitive data and its new data attributes and may create new data criteria based on this learning. The machine learning module 206 may then store information regarding the learning process into the machine learning database 221 for future use, and may store the new data criteria into the data criteria database 217 for use by the database scanning application 220 and/or the file scanning application 222.

Protecting Sensitive Data

Once sensitive data within one or more databases DB and/or within one or more files F is discovered, the system 10 next may protect the sensitive data using one or more associated policies (e.g., privacy policies or the like). The protecting of the sensitive data may be triggered by a database administrator, automatically at predetermined time intervals, or by other triggering methods.

In one embodiment, if the privacy policies mandated for the discovered sensitive data are known, the cybersecurity module 209 may implement the known policies to the sensitive data. For example, if the sensitive data is known to include credit card information, the cybersecurity module 209 may implement PCI-DSS standards.

If the policies mandated for the discovered sensitive data are not known, the system 10 may implement machine learning to learn the policies that should be applied.

Figure 8:
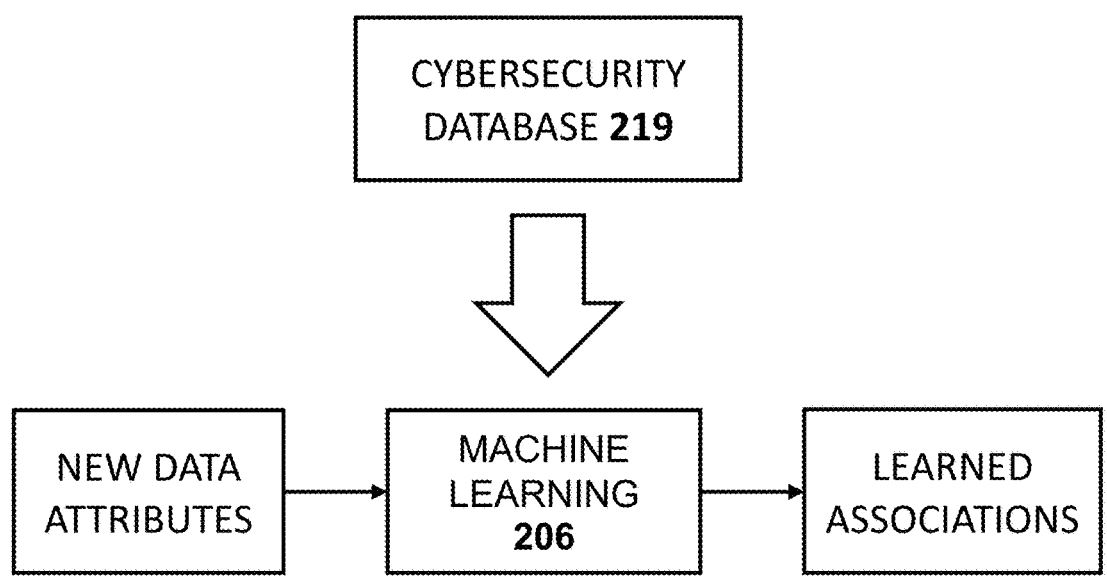

During the machine learning process, the software system 200 may store known data attributes and the privacy policies mandated for sensitive data containing those attributes into the cybersecurity database 219. As shown in FIG. 8, as new sensitive data with new data attributes is identified (e.g., by the database administrator, a regulatory entity, etc.), the new sensitive data may be applied to the machine learning module 206 and compared to the data attributes and associated policies in the cybersecurity database 219. The machine learning module 206 may then learn to associate the new data with the new data attributes to the appropriate corresponding policies. The machine learning module 206 may then store information regarding the learning process into the machine learning database 221 for future use, and store the newly learned data attributes—privacy policy associations into the cybersecurity database 219 for future implementation. In this way, as new sensitive data is discovered exhibiting the newly learned data attributes, the cybersecurity module 209 may implement or apply appropriate privacy policies to the data.

In some embodiments, the cybersecurity module 209 may store associations between each data attribute and the corresponding privacy policies, whether predetermined and/or learned via machine learning, into the cybersecurity database 219. In this way, as the system 10 discovers sensitive data in a database DB and/or in a file F, the cybersecurity module 209 may utilize stored associations to determine the appropriate privacy policies to apply to the data, and may subsequently implement the correct data protection policies accordingly. To this end, when sensitive data is found and the associated privacy policies are determined, the system 10 may automatically implement the policies and/or may suggest the policies to the database administrator for manual implementation.

Figure 9:
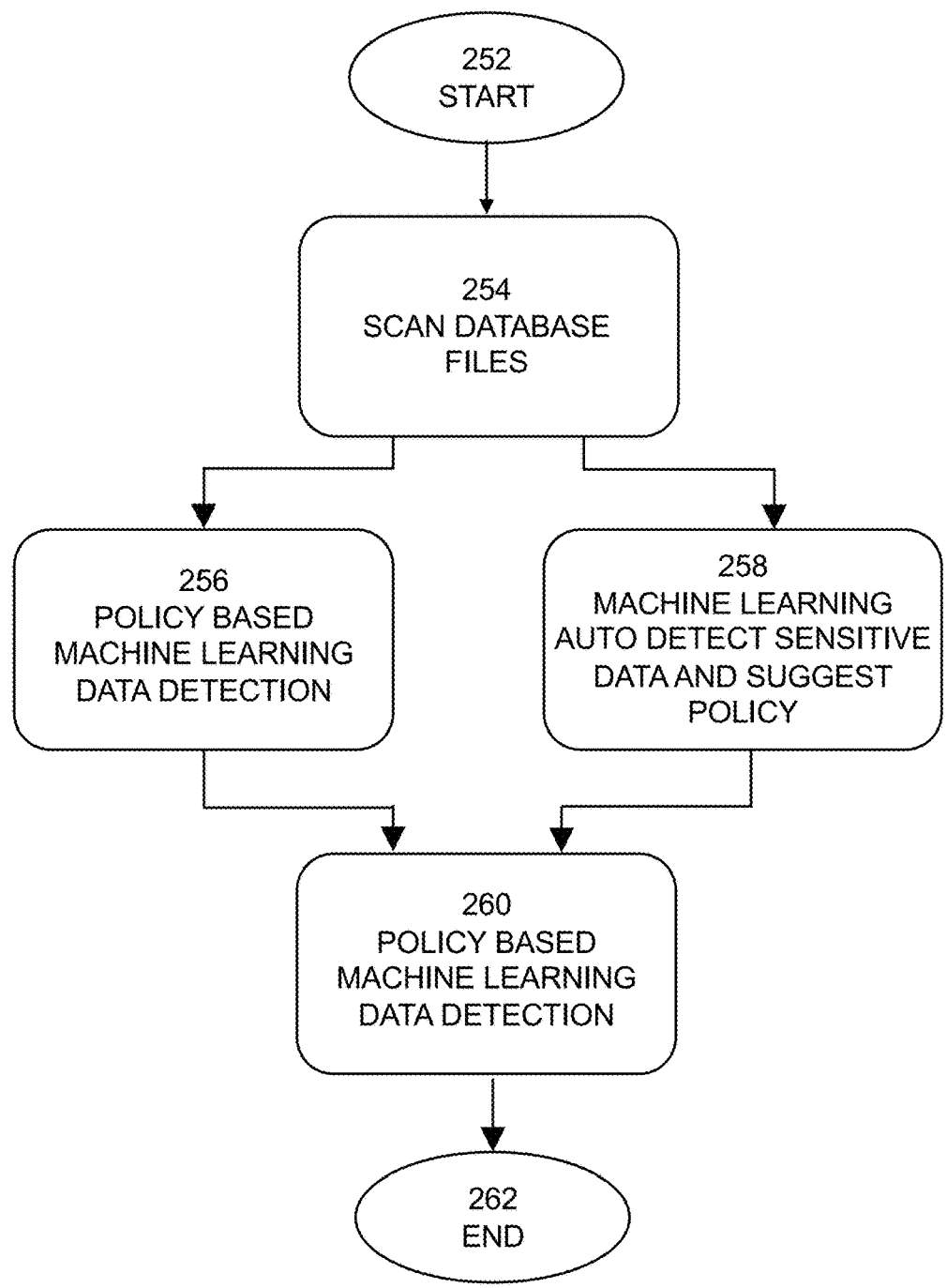
FIG. 9 is a flowchart showing aspects of an exemplary workflow according to exemplary embodiments hereof.

FIG. 9 shows a workflow schematic representing acts that may be taken by the system 10 during the above described process for protecting sensitive data. For example, a database administrator may trigger the system 10 (at 252) to perform a database DB scan (at 254). The system 10 may employ the machine learning module 206 (at 256) to determine sensitive data based on a particular privacy policy, and may employ the machine learning module 206 (at 258) to determine sensitive data based on data attributes and to suggest an associated privacy policy for the data.

The cybersecurity module 209 may (at 260) implement or apply an appropriate privacy policy for each associated sensitive data, store the policy information and end (at 262).

In some embodiments, the system 10 may apply the privacy policies to the respective sensitive data directly within the database(s) DB in which the sensitive data resides.

In other embodiments, the system 10 may apply the privacy policies to the respective sensitive data in situ through a data accessing mechanism (e.g., a data viewer that may include a browser, GUI or other type of data viewer driven by the data viewing module 208 (also referred to as a data viewer) as the data are accessed and possibly viewed by a particular user.

Figure 10:
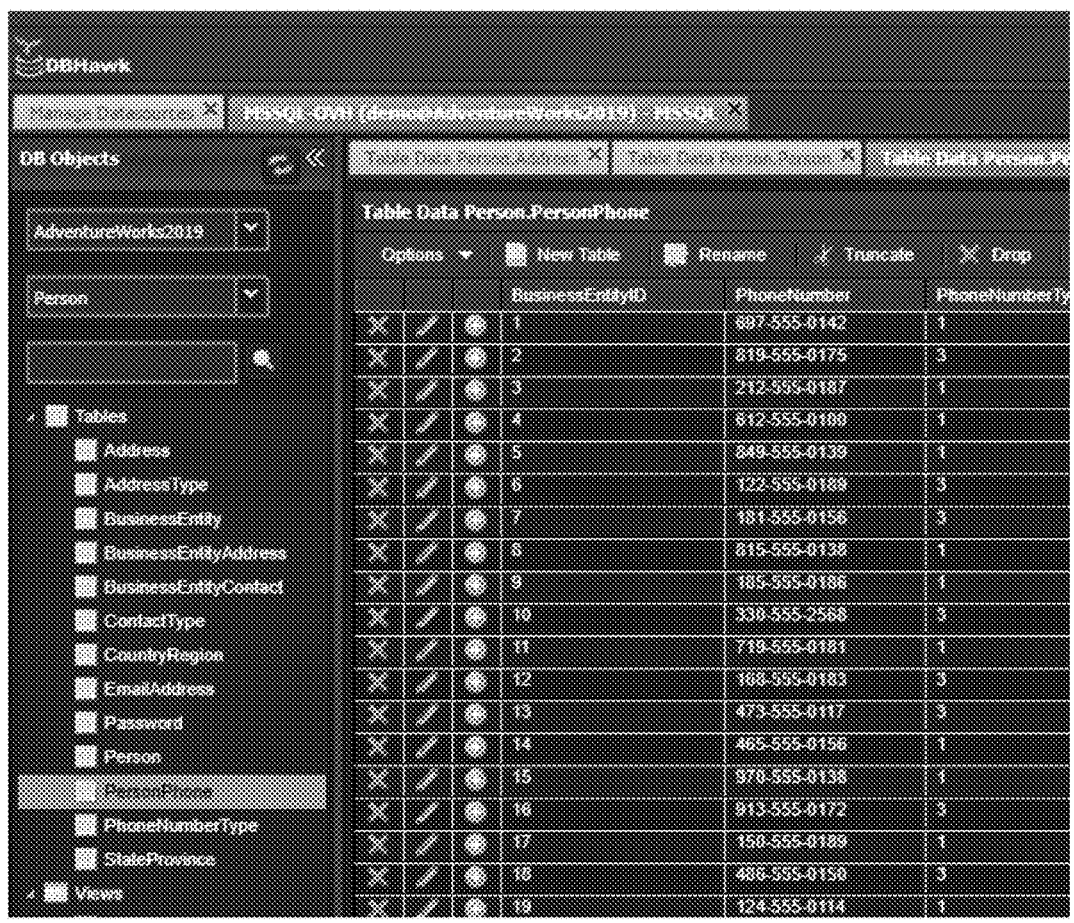
FIGS. 10-11 are example dialogues of a system according to exemplary embodiments hereof.
Figure 11:
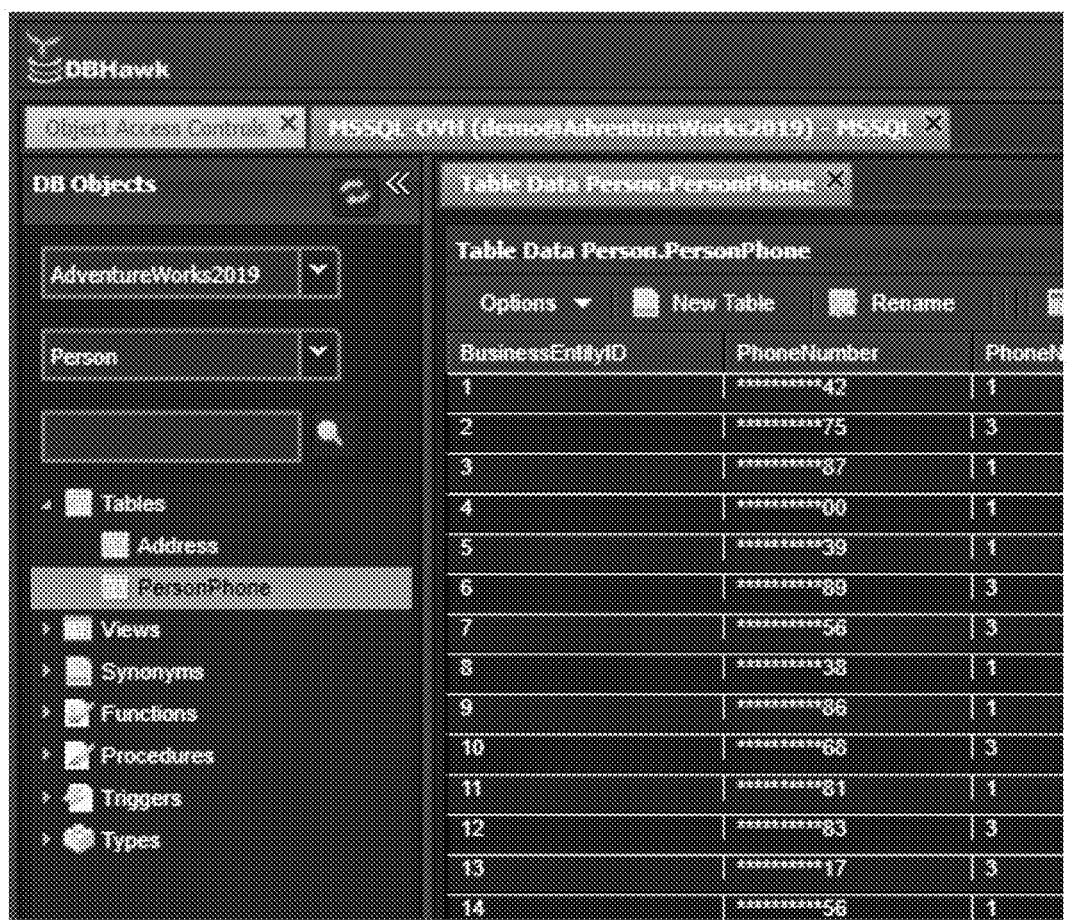

In one example, FIG. 10 shows unprotected sensitive data (e.g., personal phone numbers) stored in a table of a database DB and viewed through the data viewer prior to the system 10 applying privacy policies to the data. FIG. 11 shows the same sensitive data after the system 10 has applied the appropriate privacy policies. As seen, the system 10 has identified the sensitive data as personal phone numbers and has applied a privacy policy, thereby causing the data viewing module 208 to mask the first 8 digits of the numbers.

It is understood that the example described above is meant for demonstration and that the system 10 may apply any appropriate privacy policies to any type of sensitive data as the data are accessed via the data accessing mechanism (e.g., as the data are viewed via the data viewer).

Reporting

In some embodiments, the output module 210 may output information regarding the scanning of the network 102 and/or files, the discovery of databases DB and/or files F, the scanning of the databases DB and/or of the files F for sensitive data, the protection of the sensitive data using one or more privacy policies, and other actions taken by the system 10.

In some embodiments, the output information may be organized, formatted, and generally arranged to demonstrate adherence to any particular privacy policy as required by the system 10 and/or by the privacy policies that the system 10 may implement.

In some embodiments, the output information is stored in the reports database 223 for future reference and auditing purposes.

Computing

The functionalities, applications, services, mechanisms, operations, and acts shown and described above are implemented, at least in part, by software running on one or more computers (e.g., the backend system 100).

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed computers, special purpose computers and computing devices. One or more such computers or computing devices may be referred to as a computer system.

Figure 12:
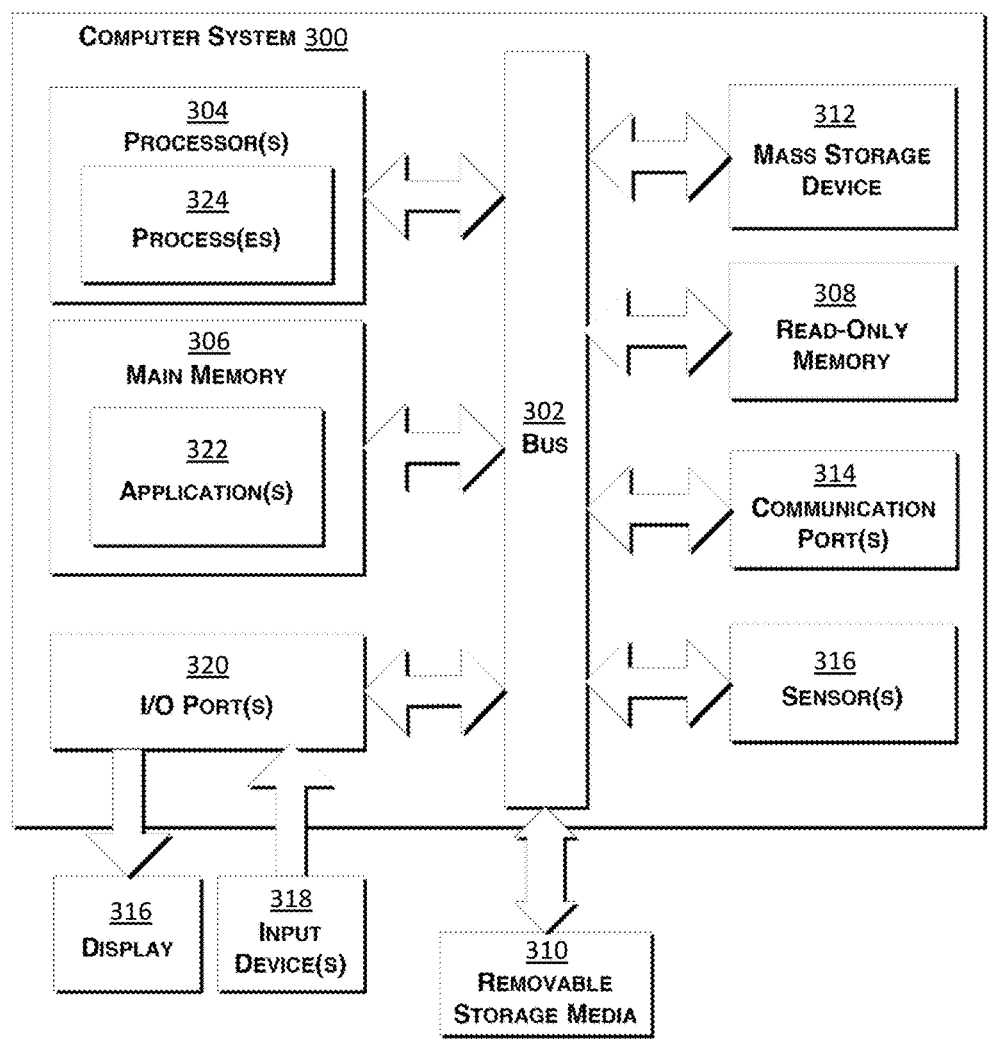
FIG. 12 depicts aspects of computing and computer devices in accordance with exemplary embodiments hereof.

FIG. 12 is a schematic diagram of a computer system 300 upon which embodiments of the present disclosure may be implemented and carried out.

According to the present example, the computer system 300 includes a bus 302 (i.e., interconnect), one or more processors 304, a main memory 306, read-only memory 308, removable storage media 310, mass storage 312, and one or more communications ports 314. Communication port(s) 314 may be connected to one or more networks (not shown) by way of which the computer system 300 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 304 can be any known processor. Typically Intel x86 processors are used for cloud and gateways, ARM A-class processors may be used for gateways and larger IoT devices, and ARM M-class may be used for IoT devices. Communications port(s) 314 can be any of an Ethernet port, a Gigabit port using copper or fiber, or a USB port, and the like. Communications port(s) 314 may be chosen depending on a network such as a Local Area Network (LAN), a Wide Area Network (WAN), or any network to which the computer system 300 connects. The computer system 300 may be in communication with peripheral devices (e.g., display screen 316, input device(s) 318) via Input/Output (I/O) port 320.

Main memory 306 can be Random Access Memory (RAM), or any other dynamic storage device(s) commonly known in the art. Read-only memory (ROM) 308 can be any static storage device(s) such as Programmable Read-Only Memory (PROM) chips for storing static information such as instructions for processor(s) 304. Mass storage 312 can be used to store information and instructions. For example, hard disk drives, an optical disc, an array of disks such as Redundant Array of Independent Disks (RAID), or any other mass storage devices may be used.

Bus 302 communicatively couples processor(s) 304 with the other memory, storage and communications blocks. Bus 302 can be any bus including an I$^2$C (Inter-Integrated Circuit or I2C) bus, an SPI (Serial Peripheral Interface) bus, a PCI/PCI-X, SCSI, a Universal Serial Bus (USB) based system bus (or other) depending on the storage devices used, and the like.

I$^2$C busses are frequently used for sensors, and SPI busses are used for some sensors and often for memory.

Removable storage media 310 can be any kind of external storage, including hard-drives, floppy drives, USB drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 306 is encoded with application(s) 322 that support(s) the functionality as discussed herein (the application(s) 322 may be an application(s) that provides some or all of the functionality of the services/mechanisms described herein. Application(s) 322 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 304 accesses main memory 306 via the use of bus 302 in order to launch, run, execute, interpret or otherwise perform the logic instructions of the application(s) 322. Execution of application(s) 322 produces processing functionality of the service related to the application(s). In other words, the process(es) 324 represent one or more portions of the application(s) 322 performing within or upon the processor(s) 304 in the computer system 300.

It should be noted that, in addition to the process(es) 324 that carries (carry) out operations as discussed herein, other embodiments herein include the application 322 itself (i.e., the un-executed or non-performing logic instructions and/or data). The application 322 may be stored on a computer readable medium (e.g., a repository) such as a disk or in an optical medium. According to other embodiments, the application 322 can also be stored in a memory type system such as in firmware, read only memory (ROM), or, as in this example, as executable code within the main memory 306 (e.g., within Random Access Memory or RAM). For example, application(s) 322 may also be stored in removable storage media 310, read-only memory 308, and/or mass storage device 312.

Those of ordinary skill in the art will understand that the computer system 300 can include other processes and/or software and hardware components, such as an operating system that controls allocation and use of hardware resources.

As discussed herein, embodiments of the present invention include various acts or operations. A variety of these acts may be performed by hardware components or may be embodied in machine-executable instructions, which may be used to cause a general-purpose or special-purpose processor programmed with the instructions to perform the operations. Alternatively, the acts may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

CONCLUSION

Where a process is described herein, those of ordinary skill in the art will appreciate that the process may operate without any user intervention. In another embodiment, the process includes some human intervention (e.g., an act is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method, in a computer system comprising one or more computers accessible and connected via one or more networks, the method implemented by one or more of said computers including hardware and software, the method comprising:
   (A) maintaining in the computer system, (i) one or more managed databases storing information about databases and/or files discovered and/or managed by the system, and (ii) a sensitive data criteria database storing information pertaining to one or more data criteria;
   (B) determining whether the computer system contains at least one database or file that is not already subject to a protection policy, said determining comprising:
      (B)(1) scanning the one or more networks, and using the one or more managed databases, to find at least one discovered database and/or file that is not managed using the one or more managed databases; and
      (B)(2) ascertaining whether the at least one discovered database or file found in (B)(1) contains data or information subject to said protection policy, said ascertaining using information in said sensitive data criteria database pertaining to said one or more data criteria; and then
   (B)(3) based on said ascertaining in (B)(2), adding information about said one or more of said at least one discovered database or file to said one or more managed databases; and then,
   (C) providing access to unprotected sensitive data in said at least one discovered database and/or file using an access mechanism that implements the protection policy on said unprotected sensitive data, as the unprotected sensitive data are accessed via said access mechanism, wherein sensitive data in said at least one discovered database and/or file are stored in unprotected form in said at least one discovered database and/or file.

2. The method of claim 1, wherein the ascertaining in (B)(2) comprises scanning the discovered database and/or file found in (A)(1) for information identified by at least one data criterion.

3. The method of claim 1, wherein data or information subject to said protection policy comprises sensitive information or data.

4. The method of claim 2, wherein the at least one data criterion is based on at least one data attribute of sensitive information or data.

5. The method of claim 2, wherein the at least one data criterion was determined using machine learning.

6. The method of claim 1, further comprising:
   applying the protection policy to data or information from the at least one discovered database and/or file.

7. A non-transitory computer-readable medium with one or more computer programs stored therein that, when executed by one or more processors of a device, cause the one or more processors to perform the method of claim 1.

8. The method of claim 1, wherein the one or more managed databases comprise:

(i) a managed databases database storing information pertaining to databases discovered and/or managed by the system; and (ii) a managed files database storing information pertaining to files discovered and/or managed by the system.

9. The method of claim 1 wherein the access mechanism comprises a data viewer, a browser, or a graphical user interface that applies the protection policy to unprotected sensitive data as the data are being accessed by a user.

10. A computer-implemented method, in a computer system comprising one or more computers accessible and connected via one or more networks, the method implemented by one or more of said computers including hardware and software, the method comprising:

(A) maintaining in a computer system, one or more managed databases storing information about databases discovered and/or managed by the system;

(B) determining whether the computer system contains at least one database that is not already subject to a protection policy, said determining comprising:

(B)(1) scanning the one or more networks to find at least one discovered database in the computer system that is not yet managed in the one or more managed databases; and (B)(2) ascertaining whether the at least one discovered database found in (B)(1) contains data or information that is not already subject to said protection policy; and then (B)(3) based on said ascertaining in (B)(2), adding information about said at least one discovered database to said one or more managed databases; and then, (C) in response to an attempt to access a particular database that is managed using the one or more managed databases, providing access to sensitive data in said particular database using an access mechanism, wherein the access mechanism applies said protection policy to said sensitive data as the sensitive data are being accessed by a user, wherein said sensitive data in said particular database are stored in said particular database in unprotected form.

11. The method of claim 10, wherein the access mechanism comprises a data viewer, a browser, or a graphical user interface that applies privacy policies to unprotected sensitive data in said particular database as the data are being accessed by the user.

12. A computer-implemented method, in a computer system comprising one or more computers accessible and connected via one or more networks, the method implemented by one or more of said computers including hardware and software, the method comprising:

(A) maintaining in a computer system, one or more managed databases storing information about files discovered and/or managed by the system;

(B) determining whether the computer system contains at least one file that is not already subject to a protection policy, said determining comprising:

(B)(1) scanning the one or more networks to find at least one discovered file in the computer system that is not yet managed in the one or more managed databases; and (B)(2) ascertaining whether the at least one discovered file found in (B)(1) contains data or information that is not already subject to said protection policy; and then (B)(3) based on said ascertaining in (B)(2), adding information about said at least one discovered file to said one or more managed databases; and then, (C) in response to an attempt to access a particular file that is managed using the one or more managed databases, providing access to unprotected sensitive data in said particular file using an access mechanism, wherein the access mechanism applies said protection policy to said unprotected sensitive data as the unprotected sensitive data are being accessed by a user, wherein said sensitive data in said particular file are stored in said particular file in unprotected form.

13. The method of claim 12, wherein the access mechanism comprises a data viewer, a browser, or a graphical user interface that applies privacy policies to unprotected sensitive data in said particular file as the data are being accessed by the user.

* * * * *